(12) United States Patent
Garg et al.

(10) Patent No.: US 8,442,111 B2
(45) Date of Patent: May 14, 2013

(54) OPTIMAL POWER USAGE IN ENCODING DATA STREAMS

(75) Inventors: Shashank Garg, Pune (IN); Vinayak Jayaram Pore, Pune (IN); Soumenkumar Dey, Pune (IN); Manish Jatashanker Pandey, Thane (IN); Harikrishna Madadi Reddy, San Jose, CA (US); Manindra Nath Parhy, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 954 days.

(21) Appl. No.: 12/277,287

(22) Filed: Nov. 24, 2008

(65) Prior Publication Data

US 2010/0128777 A1 May 27, 2010

(51) Int. Cl.
*H04N 7/12* (2006.01)
*H04B 1/12* (2006.01)

(52) U.S. Cl.
USPC ...................................... 375/240.01; 375/240

(58) Field of Classification Search ............. 375/240.01, 375/240
See application file for complete search history.

(56) References Cited

U.S. PATENT DOCUMENTS

| 6,028,631 | A | * | 2/2000 | Nakaya et al. | 375/240.01 |
| 7,852,940 | B2 | * | 12/2010 | Malayath | 375/240.16 |
| 2003/0154185 | A1 | | 8/2003 | Suzuki et al. | |
| 2004/0136596 | A1 | | 7/2004 | Oneda et al. | |
| 2004/0184541 | A1 | * | 9/2004 | Brockmeyer et al. | 375/240.16 |
| 2006/0171454 | A1 | | 8/2006 | Jung | |
| 2006/0174303 | A1 | * | 8/2006 | Yoshimoto et al. | 725/114 |
| 2007/0274245 | A1 | | 11/2007 | Balatsos et al. | |
| 2008/0112484 | A1 | * | 5/2008 | Shih et al. | 375/240.12 |
| 2008/0144949 | A1 | * | 6/2008 | Inoue | 382/233 |
| 2008/0186392 | A1 | | 8/2008 | Matsuyama | |

FOREIGN PATENT DOCUMENTS

WO 2008045633 A2 4/2008

* cited by examiner

*Primary Examiner* — Techane Gergiso

(57) ABSTRACT

An encoder provided according to an aspect of the present invention uses different encoding techniques depending on an amount of power available in the corresponding durations. Due to the ability to use such different encoding techniques, power may be optimally utilized. The optimization is further enhanced by dynamically switching between encoding techniques according to power amount availability in corresponding durations. In an embodiment, each encoding technique estimates motion vectors at corresponding level of precision (thereby consuming a corresponding level of power) and the precision level is chosen to correspond to available power budget. The circuitry not required for a desired precision level may be switched off.

20 Claims, 6 Drawing Sheets

OPTIMAL POWER USAGE IN ENCODING DATA STREAMS

BACKGROUND

1. Technical Field

The present disclosure relates to signal processing and more specifically to optimal usage of power in encoding data streams.

2. Related Art

Encoding generally refers transforming a sequence of digital values (data stream) from one format to another. Encoding often entails tasks such as compression, applying transforms, etc., as is well known in the relevant arts. Decoding generally refers to processing the encoded data to recover the original data stream, as close as possible, as is also well known in the relevant arts.

In general, encoding is performed using a specific encoding technique, and a corresponding decoding technique is thereafter used to recover the original data stream. An encoding technique is defined by a processing logic (a defined set of mathematical operations on the sequence of digital values of the source data stream).

Due to the different processing logics, different encoding techniques may require different processing resources to obtain potentially different quality (e.g., as measured by one or more of level of compression, the degree of data loss, level of precision, etc.). The processing resources in turn determine the amount of power required.

It is generally desirable that power be used optimally, while encoding data streams.

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An encoder provided according to an aspect of the present invention uses different encoding techniques depending on an amount of power available in the corresponding durations. Due to the ability to use such different encoding techniques, power may be optimally utilized.

According to another aspect of the present invention, the optimization is further enhanced by dynamically switching between encoding techniques according to power amount availability in corresponding durations.

In an embodiment, each encoding technique estimates motion vectors at corresponding level of precision (thereby consuming a corresponding level of power) and the precision level is chosen to correspond to available power budget. The circuitry not required for a desired precision level may be switched off.

Several aspects of the invention are described below with reference to examples for illustration. However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

2. Example Device

Figure 1:
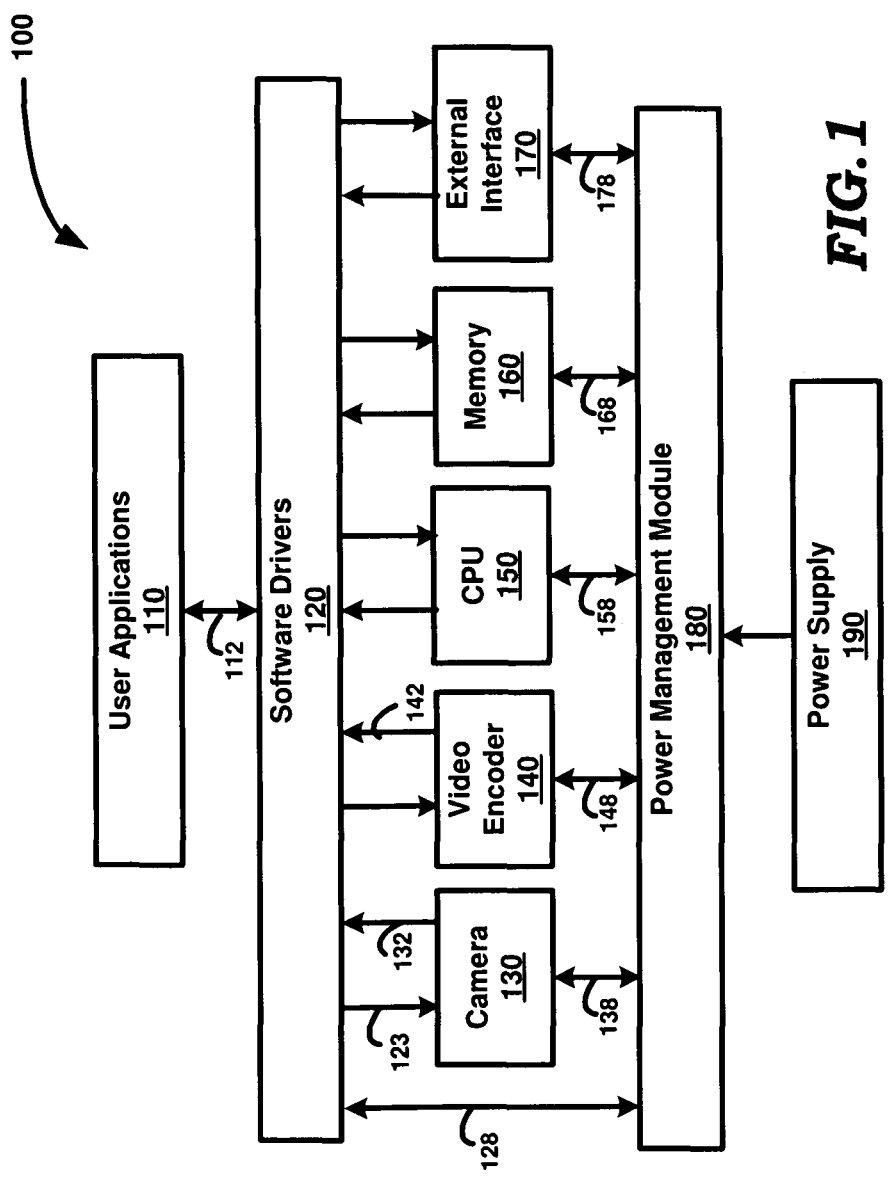
FIG. 1 is a block diagram illustrating the details of an example device in which several aspects of the present invention can be implemented.

FIG. 1 is a block diagram illustrating the details of an example device 100 in which several aspects of the present invention are implemented. The device there corresponds to a handheld video camera, though the features can be implemented in other devices as will be apparent to one skilled in the relevant arts by reading the disclosure herein. The device is shown containing user applications 110, software drivers 120, camera 130, video encoder 140, central processing unit (CPU) 150, memory 160, external interface 170, power management module 180 and power supply 190.

CPU 150 executes various software instructions constituting user applications 110 and software drivers 120, though the blocks are shown separately. In general, CPU 150 executes instructions in memory 160 to provide the corresponding utility.

External interface 170 may contain both input components (e.g., keyboard, pointer device, touch screen, buttons, USB inputs, etc.) and output components (e.g., display, speaker) using which various user interfaces can be provided. The received inputs may be provided to user applications 110 via software drivers 120 in a known way. Similarly, user applications 110 may provide output data (for display/audible reproduction) to external interface 170 via software drivers 120 also in a known way.

Each of user applications 110, when executed by CPU 150, provides a corresponding set of utilities (e.g., watching a movie, capturing a video, playing a song, etc.). The illustrative example below are described with respect to capturing a video signal in compressed form, even though the features of the invention can be used in the context of various other applications. The video capture may be initiated in response to user providing an appropriate set of inputs via external interface 170.

Power management module 180 receives power from power supply 190, and is designed to estimate the current power requirement of various components (e.g., CPU 150, memory 160). Power management module 180 may also keep track of power requirements of each user applications 110 (for example, encode, decode, internet browsing) executing on the system. Based on such estimations (or otherwise), power management module 180 may compute an amount of available power for video encoder 140. In general, the sum of power consumed by all the components may need to be less than the power level provided by power supply 190. Based on such general requirement, the available power for encoder 140 may be computed.

Software drivers 120 may contain corresponding drivers to interface with each of components 130/140/150/160/170 and 180. Thus, when a user requests video capture, the corresponding software driver may send a capture request to camera 130 on path 123. In response, software drivers 120 may receive data stream representing a sequence of captured image/picture frames on path 132. The data streams may be sent for encoding to video encoder 140. The encoded data may be received and then sent to CPU 150 for further processing (e.g., storing on a secondary storage or transmission to an external device).

Encoder 140 encodes the data received from software drivers 120. During such encoding, power may be optimally used as described below with examples.

3. Encoding Technique

Figure 2:
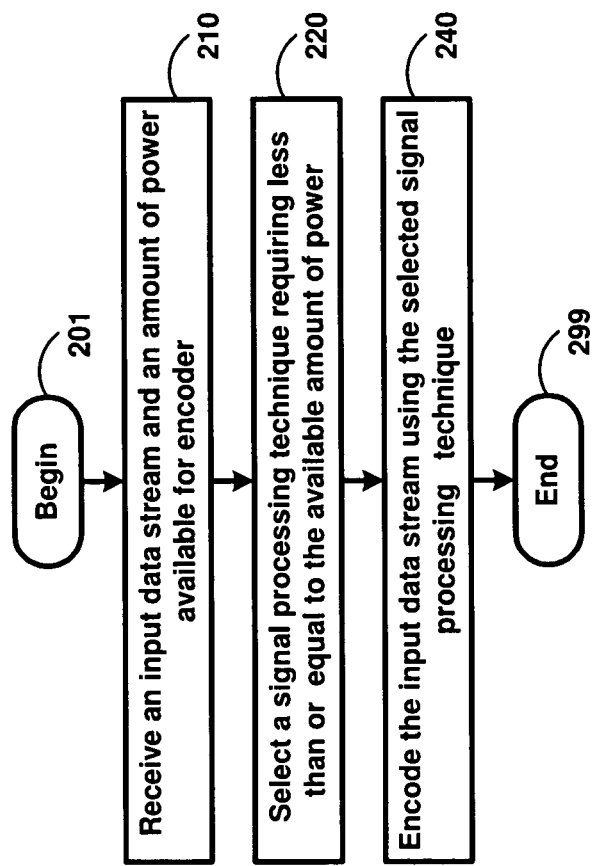
FIG. 2 is a flowchart illustrating the manner in which power is optimally used in an embodiment of the present invention.

FIG. 2 is a flowchart illustrating an encoding technique in one embodiment of the present invention. The flowchart is described below with reference to FIG. 1 merely for illustration. However, various features can be implemented in other environments and for other types of data (e.g., audio). Alternative embodiments in other environments, using different sequence of steps can also be implemented without departing from the scope and spirit of several aspects of the present invention, as will be apparent to one skilled in the relevant arts by reading the disclosure provided herein. The flow chart begins in step 201 and control passes to step 210.

In step 210, software driver 120 receives an input data stream and an amount of power available for encoding operations. The input data stream contains a sequence of digital values representing information of interest. In the case of FIG. 1, the digital values may represent a sequence of frames captured by camera 130. The amount of power can be for any duration (e.g., for a duration unless changed later), consistent with the implementation of encoder 140.

In step 220, software driver 120 selects a signal processing technique requiring less than or equal to the available amount of power. For example, if the available power is low (e.g., power source 190 at a present time instance, corresponds to a battery, as opposed to being source from external power supply from utility companies), an encoding technique with lower quality (assuming it requires resources that would consume less power) may be selected.

In step 240, software driver 120 encodes the input data stream using the selected signal processing technique. As may be appreciated, the resource requirements are determined by the implementation of the signal processing technique (by a corresponding combination of hardware, software and firmware). Thus, by indicating the amount of power, the aggregate available power may be optimally used. The flowchart ends in step 299.

While the flowchart above has been described with respect to selection of encoding technique in a single instance, it should be appreciated that the features there can be repeated several times, as suited in the specific environment. In addition, various approaches can be employed for implementing the corresponding encoding techniques. Example implementations illustrating such features are described below.

4. Example Implementation

Figure 3:
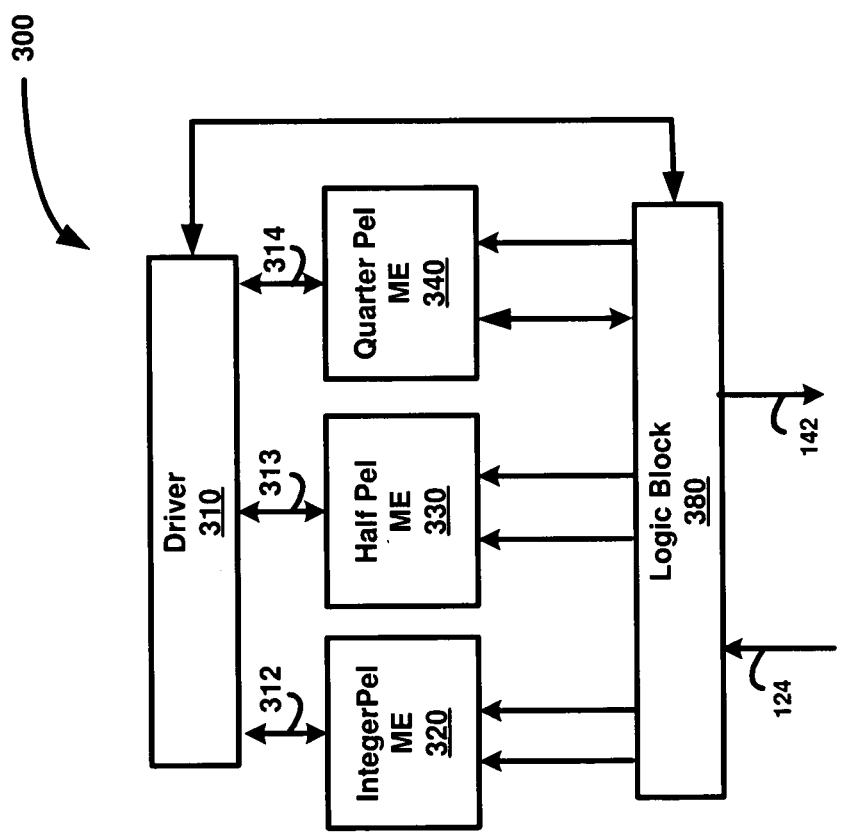
FIG. 3 is a block diagram illustrating the details of a video encoder in one embodiment.

FIG. 3 is a block diagram illustrating the details of a portion of an encoder in an embodiment of the present invention. The block diagram is shown containing driver 310, integer Pel motion estimation (ME) 320, half Pel ME 330, quarter Pel ME 340 and logic block 380. Each block is described below in further detail.

Driver 310 may correspond to one of the drivers in software drivers 120 or alternatively implemented within video encoder 140. In general, driver 310 receives the available amount of power and turns on/off only the desired motion estimation blocks. In addition, driver 310 communicates the specific estimation blocks operational for encoding purpose so that logic block 380 can perform the remaining encoding operations based on the available data from only the operational (not switched off) components.

Logic block 380 represents all the encoding operations ("remaining operations") other than motion estimation operation performed by blocks 320/330/340. The remaining operations depend on the specific encoding algorithm and input/output formats employed in the corresponding environment. It should be appreciated that logic block 380 is to be implemented with a different number of motion estimations (at corresponding precisions) that would be available depending on which of blocks 320/330 and 340 are turned on/off. The implementation of logic block 380 will be apparent to one skilled in the relevant arts.

Integer Pel Motion Estimation (ME) 320 estimates the motion between the two successive image frames (or portions thereof) to a precision of integer pixel values as well known in the art. For example, integer Pel ME 320 may place a second/immediate image frame at positions that are one pixel distance away from the first/previous frame received in the sequence and compute the difference.

Figure 4:
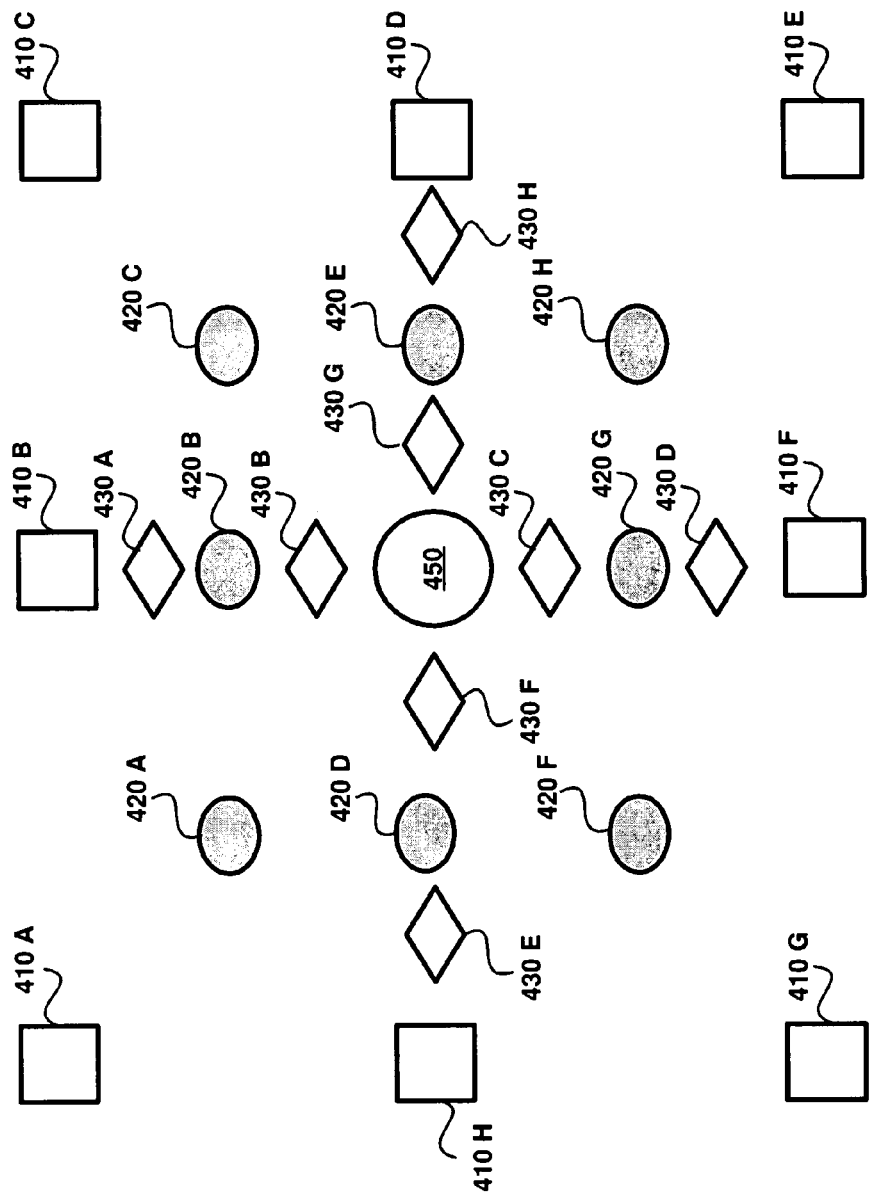
FIG. 4 is block diagram illustrating the relative pixel position for computation of motion estimation.

Positions 410A-410H in FIG. 4 illustrates example relative integer pixel positions. The computed estimation for each position (for example 8 positions) is provided as output to logic block 380. Integer Pel ME 320 may be implemented using any known technique and correspondingly, may consume an X amount of power per frame in order to perform the motion estimation at a desired speed.

Half Pel ME 330 estimates the motion between two successive frames between to a precision of half pixel distance. For example, the half Pel ME 340 may place a second image frame at positions that are half pixel distance away from the corresponding first frame received in the sequence.

Positions 420A-420H in FIG. 4 illustrates example relative half pixel positions. Computed estimation for each position (for example 8 positions) is provided as output on path 142. Half Pel ME 320 may be implemented using any known technique and correspondingly, may consume Y amount of power per frame in order to perform the motion estimation at a desired speed.

Similarly, quarter Pel ME 340 estimates the motion between two successive image frames to a precision of quarter pixel value. Positions 430A-430H in FIG. 4 illustrates example relative quarter pixel positions. Quarter Pel ME 340 may be implemented using any known technique and correspondingly, may consume Z amount of power per frame in order to perform the motion estimation at a desired speed.

Driver 310 controls the operation of Integer Pel ME 320, half Pel ME 330, and quarter Pel ME 340 based on the received power budget. The received power budget (amount of available power) may indicate the available power for performing the encoding operation/motion estimation. Driver may also maintain the details of the power requirement of integer Pel ME 320, half Pel ME 330, and quarter Pel ME 340.

In one embodiment, driver 310 may turn on Integer Pel ME 320, half Pel ME 330 and quarter Pel ME 340 (example of first encoding technique) when the available power for encoding is equal to or greater than (X+Y+Z; X=power for Integer Pel, Y=Half Pel and Z=Quarter pel), assuming the computations in logic block 380 are negligible for illustration. Thus motion estimation is performed at more number of relative positions (in this case 24). Accordingly, logic block 380 may receive estimated values (representing the degree of match between two successive frames) for each of 24 positions, and selects the best matching one of the 24 positions for compressing the presently processed image frame. Since more positions at sub pixel levels are considered for encoding, the frames (sequence of digital values) thus encoded generate high quality (less loss of information) of encoded signal.

Alternatively, driver 310, may turn on only integer Pel ME 320 and half Pel ME 330 (example of second encoding technique) when the available power for encoding is greater than (X+Y) and less than (X+Y+Z). Thus motion estimation is performed at relatively lesser number of relative positions (in this case 16). Accordingly, the closest match among 16 positions is selected (by logic block 380) to encode the frames providing medium quality of encoded signal.

Similarly, driver 310 may turn on only integer pel ME 320 when the available power is less than X+Y and greater than X. Thus, the motion estimation is performed at 8 relative positions. Accordingly, best closest match among 8 positions are selected to encode the frames providing low quality of encoded signal In an alternative embodiment, driver 310 may select one of integer Pel ME 320, half Pel ME 330 and quarter Pel 340 respectively for the availability of X, Y and Z amount of power.

From the above, it may be appreciated that power may be optimally used in encoding potentially each successive image frame. The power consumption can be dynamically adjusted as described below with an example.

5. Dynamic Selection of Encoding Technique

Figure 5:
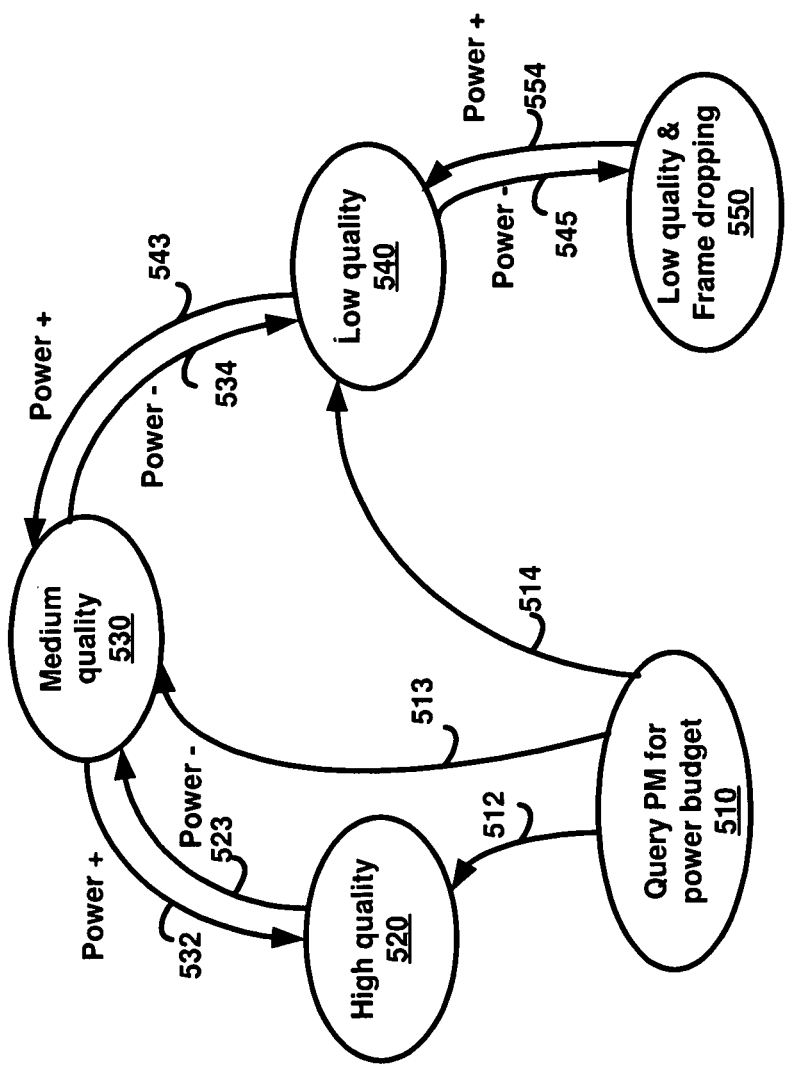
FIG. 5 is state diagram illustrating the dynamic selection of encoding techniques depending on the available power, in an embodiment of the present invention.

FIG. 5 is a state diagram illustrating dynamic selection of processing (encoding/decoding) technique based on power availability in one embodiment of the present invention. The state diagram is shown containing states "Query power management module for power budget" 510, high quality 520, medium quality 530, low quality 540, and "low quality & frame dropping" 550. Each state and corresponding transitions are described below in further detail.

Query PM for power budget state 510 represents an initial state of encoder 300. In this state, driver 120/310 queries the power management system (PM) 180 for available power to encode a data stream. Driver 120/310 receives value of the available power 512, 513, and 514 and respectively changes the state of the encoder to high quality 520, medium quality 530 and low quality 540. The change entails switching on/off the corresponding motion estimation blocks and communicating the same to logic block 380.

In each of high quality state 520, medium quality state 530 and low quality state 540, video encoder 140 operates to generate a high quality, medium quality, and low quality (more information loss for low quality) encoded signal respectively. For example, with reference to description of FIG. 3, power 512, 513 and 514 may respectively represent values X+Y+Z, X+Y, and X.

Accordingly, state high quality 520 represents Integer Pel ME 320, half Pel ME 330 and quarter Pel ME 340 being turned on. Similarly, medium state 530 and low state 540 respectively represents the situation when Integer Pel ME 320 and half Pel ME 330 are turned on, and only Integer Pel ME 320 being turned on.

In "low quality & frame dropping" 550 state, video encoder 140 operates to drop frames to decrease the framerate to less than a desired value to perform encoding within available amount of power. Due to the frame dropping, the power usage of each module present in the encoding chain may decrease with each dropped frame.

However, drop in frames may result in a change (reduction) in the bit rate of the encoder output from the desired bit-rate. Such a reduction in the bit rate may be compensated by adjusting the rate control parameters (RC), as is well known in the relevant arts. For example, average bytes per frame (generally classified as Rate Control (RC) parameters) is given by bit-rate/frame-rate and programmed into video encoder (example logical block 380).

The encoder may adjust RC parameter when frames are dropped to maintain the target bit-rate. Further, drop in frames provides more bit budget to encode the frames. Thus in one embodiment, the subjective quality of encoded frames will not drop drastically. Also, the quality of the encoded sequences can be increased by insertion of I-slices/frames and/or with more Intra-refresh macro-blocks.

Further driver 310/120 may receive the power allocation (availability) at a regular interval. The power once allocated may change during the encoding operation due to initiation/termination of one or more user applications. Accordingly, driver may change the state of the encoder based on the reduction (power −) or increase (power +) in the available power. Transitions 532, 543, and 554 represents transition due to increase (+) in available power (for encoding) and transitions, 523, 534, and, 545 represent the transitions due to reduction (−) in available power. Thus, these transitions are caused upon corresponding increases or decreases of available power.

The choice of transitions can be determined based on specific requirements of the environment as will be apparent to one skilled in the relevant arts. For example, driver 310 may switch the encoder operation from high quality to medium if the available power has reduced to less than X+Y+Z during the encoding process.

The manner in which the power dynamic selection of the encoding technique is performed according to above description is described with reference to H.264 encoder below.

6. Example H.264 Encoder

Figure 6:
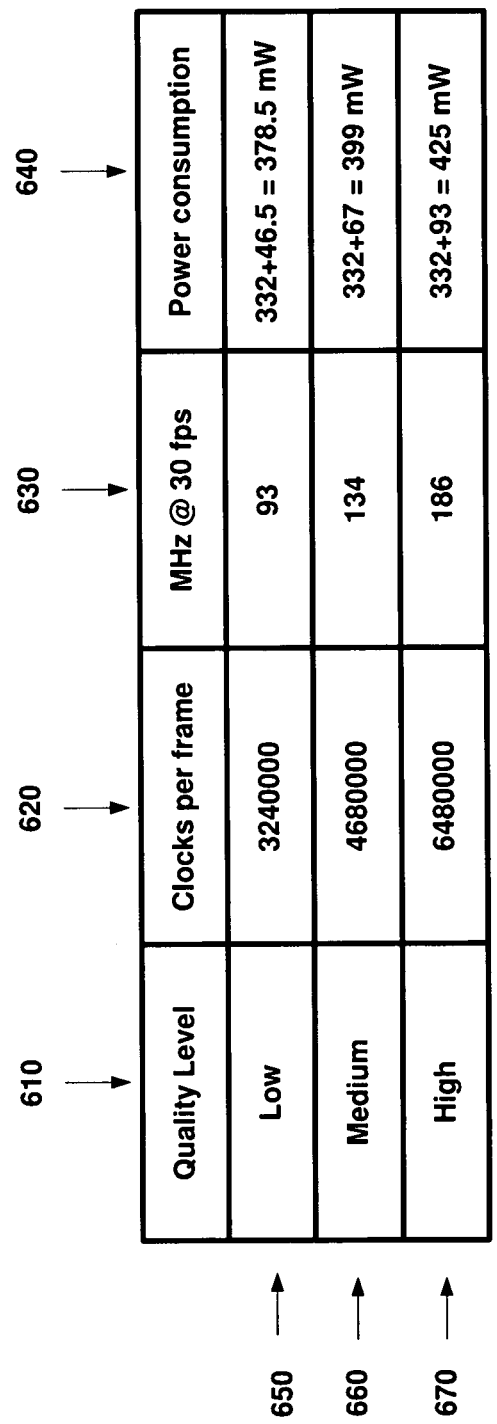
FIG. 6 is a table illustrating different encoding techniques used for different amounts of available power in an embodiment of the present invention.

FIG. 6 is table illustrating the list of encoding techniques and corresponding power requirement details for a H.264 encoder at 720p resolution (images having size of 1280×720). Column 610 lists encoding techniques, column 620 represents the number of clock cycles required to encode a frame of data, column 630 represents frequency of the clock cycles to achieve a throughput of 30 fps (frames per second) and column 640 represents the power required for 30 fps to perform the corresponding encoding technique.

In this illustrative example, row 650 represents the details of low quality encoding technique, row 660 represents the details of medium encoding technique and row 670 represents the details of high quality encoding technique. The low, medium and high quality encoding techniques are implemented according to H.264 standards. It is further assumed for illustration that 332 mW is the constant power consumed by entire video encoding process (for example, power consumed by all blocks 130, 150, 160, 170, while operating in conjunction with block 140 for encoding video signal) while, video encoder 140 consumes incremental power at each quality level.

The description is continued with an example embodiment with a standard Li-ion 4000 mWh battery and desired life for the device (running any number of applications) being at least 5 hours in a single battery charge. Thus power management module 180 limits the maximum power drawn at any point of time to 800 mW (4000 mwh/5).

If the device is already running and consuming 400 mW at the time of starting a video encoding application at 720p resolution, software driver 120 queries (according to state 510) the power management (PM) module 180 to find that only 400 mW (example of transition 513) is available and hence sets medium quality (state 530) for encoding since the medium quality is shown requiring only 399 mW.

Thus, from the description above, it may be appreciated that the encoding technique can be chosen to correspond to available power and thus power can be used optimally.

In addition, though switching off/on of motion estimation blocks 320/330/340 is described as an approach to optimal usage of power, other techniques (e.g., disabling only a portion of the circuitry, using approaches that require reduced computations, even if implemented only in software) to reduce power consumption can also be used in the encoder, without departing from the scope and spirit of several aspects of the present invention, as will be apparent to one skilled in the relevant arts.

Similarly, though the description is provided with respect to processing of video data, it should be appreciated that the features can used for deciding other types of signal data (e.g., audio).

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A device comprising:
an encoder to encode a data stream comprising a sequence of digital values; and
a power management module to indicate an amount of available power, said power management module being designed to indicate a sequence of amounts of available power at corresponding time instances,
wherein said encoder is designed to receive said sequence of amounts and to select an encoding technique to encode a corresponding subset of said sequence of digital values in response to said receiving said sequence of amounts, and to select a first encoding technique to encode said data stream if said amount is above a threshold and a second encoding technique otherwise,
further wherein said sequence of digital values represent a sequence of image frames and said encoder comprises a first block designed to estimate motion between successive image frames at a first resolution and a second block designed to estimate motion between successive image frames at a second resolution, which respectively perform said first encoding technique and said second encoding technique.

2. The device of claim 1, wherein said first encoding technique requires more power than said second encoding technique to encode a same amount of digital values, whereby encoding technique requiring more power is selected when said amount of available power is more.

3. The device of claim 2, wherein said first block is operable to be switched off when said second encoding technique is selected and is operable to be switched on when said first encoding technique is selected.

4. The device of claim 3, further wherein said first resolution is greater than said second resolution.

5. The device of claim 4, wherein said first resolution is equal to a fraction of a pixel of the image frames and said second resolution equals one pixel of the image frames.

6. The device of claim 5, further comprising a software driver to receive said amount of available power, to select said first encoding technique or said second encoding technique, and to switch off one of said first block and said second block.

7. The device of claim 6, further comprising a central processing unit (CPU) and a memory, said power management module to compute said amount of available power based on a power received from a power supply and power requirements of said CPU and said memory.

8. The device of claim 6, wherein said second encoding technique further comprises;
dropping the intermediate image frames; and
adjusting a rate control parameter to provide output at a desired bit rate.

9. The device of claim 8, wherein said second encoding technique further comprises inserting a plurality of I-slices/frames to said sequence of image frames to compensate for said dropping the intermediate image frames.

10. The device of claim 9, wherein said inserting a plurality of I-slices/frames comprises inserting a plurality of I-slices/frames with a greater number of Intra-refresh macro-blocks.

11. The device of claim 1, wherein said first block is designated to estimate motion between successive image frames at a greater number of relative positions than said second block.

12. A system comprising:
an encoding device configured to encode a sequence of digital values representing a sequence of image frames, said encoding device comprising:
a first block designed to perform an encoding operation based on a first encoding and to estimate motion between successive image frames at a first resolution;
a second block designed to perform said encoding operation based on a second encoding technique and to estimate motion between successive image frames at a second resolution; and
a driver configured to receive a sequence of amounts of available power at corresponding time instances and, in response to receiving said sequence of amounts of available power to select between a first encoding technique and a second encoding technique to encode a corresponding subset of said sequence of digital values,
wherein said first encoding technique is selected to encode a corresponding subset of said sequence of digital value if said amount is above a threshold, and said second encoding technique is selected to encode said corresponding subset of said sequence of digital value otherwise, further wherein said driver is configured to switch off said first block if said sequence of digital values are to be encoded using said second encoding technique and to switch off said second block if said sequence of digital values are to be encoded using said first encoding technique.

13. The system of claim 12, wherein said first encoding technique requires more power than said second encoding technique to encode a same amount of digital values, whereby encoding technique requiring more power is selected when said amount of available power is more.

14. The system of claim 13, wherein said first resolution is greater than said second resolution, wherein said encoder is designed to receive said sequence of amounts and to select an encoding technique to encode a corresponding subset of said sequence of digital values in response to said receiving said sequence of amounts, wherein said encoder selects a first encoding technique to encode said data stream if said amount is above a threshold and selects a second encoding technique otherwise, further wherein said sequence of digital values represent a sequence of image frames and said encoder comprises a first block designed to estimate motion between successive image frames at a first resolution and a second block designed to estimate motion between successive image frames at a second resolution, which respectively perform said first encoding technique and said second encoding technique.

15. The system of claim 14, wherein said first resolution is equal to a fraction of a pixel of the image frames and said second resolution equals one pixel of the image frames.

16. The system of claim 15, wherein said image frames are encoded according to H.264 standard.

17. A method of processing a digital data stream, said method comprising:

receiving a sequence of amounts of available power at corresponding time instances;

in response to said receiving, selecting a first encoding technique if said amount is above a threshold and a second encoding technique otherwise; and encoding said digital bit stream according to said selected encoding technique using a plurality of components designed to perform motion estimation at a corresponding precision, wherein said data stream comprises a sequence of digital values, further wherein said encoding comprises encoding a corresponding subset of said sequence of digital value according to each of the selected encoding techniques.

18. The method of claim 17, wherein said first encoding technique requires more power than said second encoding technique to encode a same amount of digital values, whereby said selecting step encodes a technique requiring more power when said amount of available power is more.

19. The method of claim 18, wherein an operation of said encoding is performed using a plurality of components, said method further comprises switching on or off some of said plurality of components.

20. The method of claim 19, wherein a first component of said plurality of components is designed to perform motion estimation at a first precision, and a second component of said plurality of components is designed to perform motion estimation at a second precision, said first precision being greater than said second precision.

* * * * *